United States Patent
Jiao et al.

(10) Patent No.: US 9,530,041 B2
(45) Date of Patent: *Dec. 27, 2016

(54) PROCESSING VISIBLE CODING SEQUENCE, PLAYING VISIBLE CODING SEQUENCE

(71) Applicant: International Business Machines Corporation, Armonk, NY (US)

(72) Inventors: Jiexin Jiao, Beijing (CN); Mengxiang Lin, Beijing (CN); Song Song, Beijing (CN); XiaoFeng Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,626

(22) Filed: Mar. 15, 2016

(65) Prior Publication Data

US 2016/0196458 A1   Jul. 7, 2016

Related U.S. Application Data

(63) Continuation of application No. 14/416,470, filed as application No. PCT/CN2013/079261 on Jul. 12, 2013, now Pat. No. 9,317,731.

(30) Foreign Application Priority Data

Jul. 31, 2012  (CN) .......................... 2012 1 0269828

(51) Int. Cl.
*G06F 7/10* (2006.01)
*H03K 3/00* (2006.01)
(Continued)

(52) U.S. Cl.
CPC ......... *G06K 7/146* (2013.01); *G06K 19/06112* (2013.01)

(58) Field of Classification Search
CPC ............ G11B 7/10; G11B 5/09; G02B 26/10; G06K 7/14; G06K 19/06; G06K 9/22; G06K 7/10; G06F 17/10; G06F 7/10; H03K 3/00
(Continued)

(56) References Cited

U.S. PATENT DOCUMENTS 8,061,615 B2   11/2011 Yada
2005/0085188 A1   4/2005 Ishii et al.
(Continued)

FOREIGN PATENT DOCUMENTS

CN   1731717 A   2/2006
JP   2010140092 A   6/2010
WO   2005004093 A2   1/2005

OTHER PUBLICATIONS

International application No. PCT/CN2013/079261, International Search Report and Written Opinion, dated Oct. 3, 2013, 11 pages.
(Continued)

*Primary Examiner* — Edwyn Labaze
(74) *Attorney, Agent, or Firm* — Douglas A. Lashmit; Hoffman Warnick LLC

(57) ABSTRACT

Embodiments of the present invention generally relate to data processing, and further the embodiments of the invention relate to a method of processing a visible coding sequence and a system thereof, a method of playing a visible coding sequence and a system thereof. The present invention creatively proposes a scheme of determining sampling rate with synchronized frames to realize effective processing of a visible coding sequence. The scheme of processing a visible coding sequence according to the present invention is helpful for visible coding synchronization on the capturing side, enabling the capturing side to determine appropriate sampling rate and sampling timing, and thus effectively (Continued)

acquire the visible coding sequence, which may not only reduce resource waste, but also acquire a complete visible coding sequence.

17 Claims, 8 Drawing Sheets

(51) Int. Cl.
*G06K 7/14* (2006.01)
*G06K 19/06* (2006.01)

(58) Field of Classification Search
USPC .... 235/462.28, 375, 462.18, 462.19, 462.25, 235/462.01
See application file for complete search history.

(56) References Cited

U.S. PATENT DOCUMENTS

| | | |
|---|---|---|
| 2006/0071077 A1 | 4/2006 | Suomela et al. |
| 2010/0103018 A1 | 4/2010 | Yoon et al. |
| 2010/0157024 A1 | 6/2010 | Park et al. |
| 2010/0272193 A1 | 10/2010 | Khan et al. |
| 2011/0085732 A1 | 4/2011 | Cheng |
| 2011/0284640 A1 | 11/2011 | Mullen et al. |
| 2011/0290882 A1 | 12/2011 | Gu et al. |
| 2012/0069408 A1 | 3/2012 | Tsutsumi |

OTHER PUBLICATIONS

Labaze, Office Action Communication for U.S. Appl. No. 14/416,470, dated Sep. 4, 2015, 12 pages.
Labaze, Notice of Allowance and Fee(s) Due for U.S. Appl. No. 14/416,470, dated Sep. 4, 2015, 7 pages.

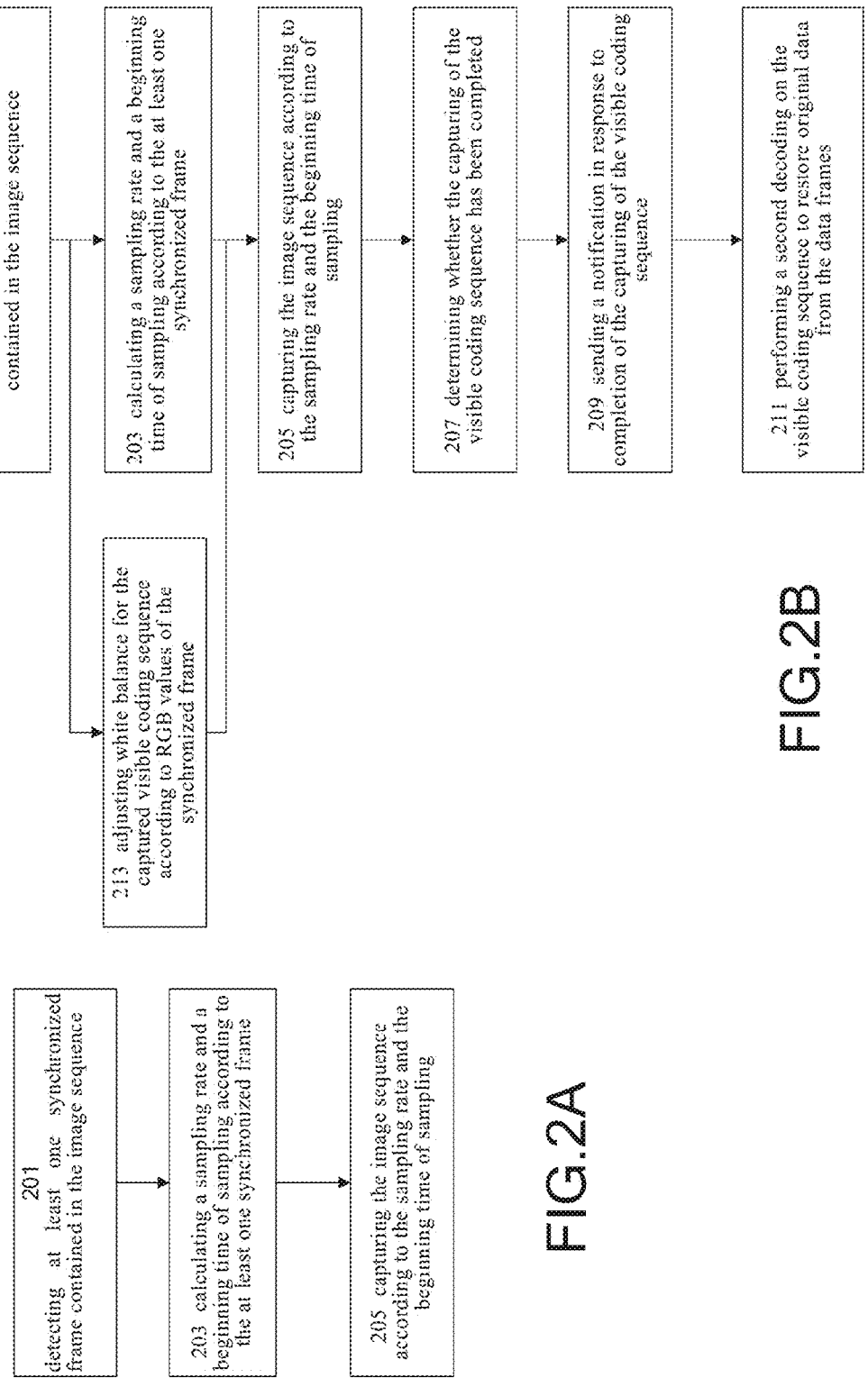

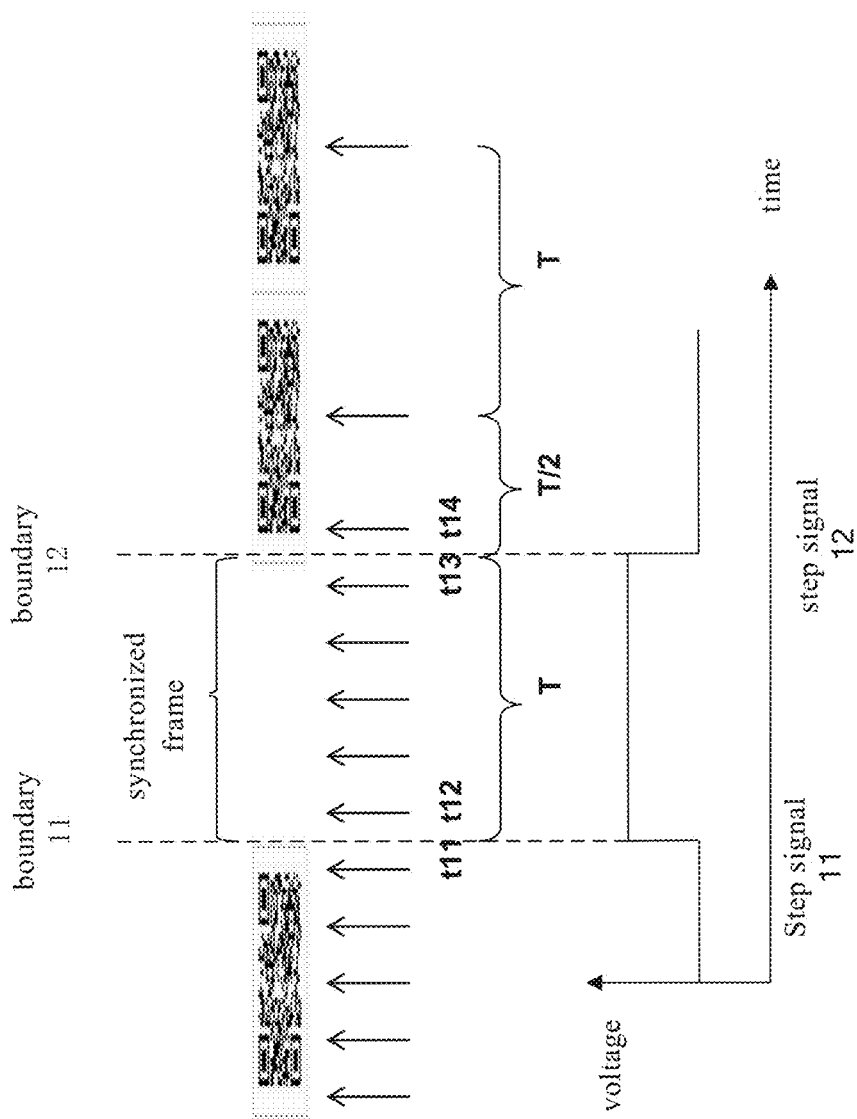

PROCESSING VISIBLE CODING SEQUENCE, PLAYING VISIBLE CODING SEQUENCE

TECHNICAL FIELD

The embodiments of the present invention generally relate to data processing, and more specifically, to a method and system of processing a visible coding sequence as well as a method and system of visible coding sequence playing.

RELATED ART

Information transmission can be categorized into paper transmission and electronic transmission in terms of transmission media. With the development of communication and network techniques, electronic transmission has a variety of derived forms, including network-dependent information transmission (e.g., WiFi, 3G, Bluetooth), and network-independent information transmission (e.g., barcode, two-dimensional code scanning or the like). For network-dependent information transmission, network environment support is necessary.

For network-independent information transmission, although no network environments are needed, they usually have relatively limited amounts of transmitted information. Taking two-dimensional bar code as an example, two-dimensional bar code is graphic code which records data symbol information using interleaved black and white patterns of special geometric patterns distributing in a regular manner over a plane (in two dimensional directions). Currently, two-dimensional code has been widely employed in industry automatic identification, logistics industry, electronic ticketing, shops and other fields. There are many format standards for two-dimensional code, including Codebar, RSS-14 (all variants), QR Code, Data Matrix, Aztec ('beta' quality), PDF 417 ('alpha' quality), etc. A two-dimensional pattern encoded with PDF 417 code has a maximum data capacity of 928 codewords. That is to say, each two-dimensional code may proximately accommodate 1850 characters (in the extended alphanumeric compressed format), 1108 bytes (in the binary/ASCII format), or 2710 numbers (in the digital compression format). However, the amount of information that can be carried on a two-dimensional code pattern is still very limited. In order to provide a method capable of transmitting two-dimensional code data having a larger amount of information, it has been disclosed in the prior art to transmit more information through successively playing a two-dimensional code sequence.

SUMMARY

However, continuously playing a two-dimensional code sequence requires an image capturing device capable of sampling a two-dimensional code sequence intensively to ensure the acquisition of the complete two-dimensional code sequence. To fully acquire each frame of two-dimensional code in a two-dimensional code sequence, sampling density must be set higher enough to ensure there is not any frame of two-dimensional code missed. If the image capturing device does not have knowledge about the playing rate of the two-dimensional code sequence, it is difficult for the image capturing device to determine how to set its sampling density to prevent two-dimensional code frames from being missed. If the image capturing device always samples two-dimensional code frames with its highest sample density, resource wastes may caused, including processing resource and power wastes. For a camera device (especially, camera devices on mobile phones), electric energy cost is restricted, thus it is desired to complete capture tasks as many as possible with a minimum energy consumption.

The present invention inventively provides a solution of determining sampling rate through synchronized frames to achieve effective processing of a visible coding sequence.

Particularly, a method of processing a visible coding sequence is provided in the present invention, wherein the visible coding sequence comprises a plurality of time-continuous frames including multiple data frames and at least one synchronized frame, the method comprising: detecting the at least one synchronized frame contained in the visible coding sequence; calculating a sampling rate and a beginning time of sampling according to the at least one synchronized frame; and capturing the visible coding sequence according to the sampling rate and the beginning time of sampling.

A method of playing a visible coding sequence is further provided in the present invention, comprising: encoding original data into a visible coding sequence, wherein the visible coding sequence comprises a plurality of time-continuous frames including multiple data frames; inserting synchronized frames in the visible coding sequence; and playing the visible coding sequence to facilitate to process the visible coding sequence according to the method as described above.

A system of processing a visible coding sequence is further provided in the present invention, wherein the visible coding sequence comprises a plurality of time-continuous frames including multiple data frames and at least one synchronized frame, the system comprising: a first detecting device configured to detect the at least one synchronized frame contained in the visible coding sequence; a first calculating device configured to calculate a sampling rate and a beginning time of sampling according to the at least one synchronized frame; and a capturing device configured to capture the visible coding sequence according to the sampling rate and the beginning time of sampling.

A system of playing a visible coding sequence is further provided in the present invention, comprising: an encoding device configured to encode original data into a visible coding sequence, wherein the visible coding sequence comprises a plurality of time-continuous frames including multiple data frames; a first inserting device configured to insert synchronized frames in the visible coding sequence; and a playing device configured to play the visible coding sequence to facilitate to process the visible coding sequence according to the system as described above.

The solution of processing a visible coding sequence provided in the present invention can facilitate visible coding synchronization on the capturing side, so that an appropriate sampling rate and a sampling timing can be determined on the capturing side to enable the capturing side to acquire the code sequence effectively, which may reduce resource wastes (including processing resources and power resources wastes) while guaranteeing the complete acquisition of the visible coding sequence.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2A shows a flowchart of a method of processing a visible coding sequence according to an embodiment of the present invention;

FIG. 2B shows a flowchart of a method of processing a visible coding sequence according to another embodiment of the present invention;

FIG. 3A shows a schematic diagram of synchronized frames according to an embodiment of the present invention;

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
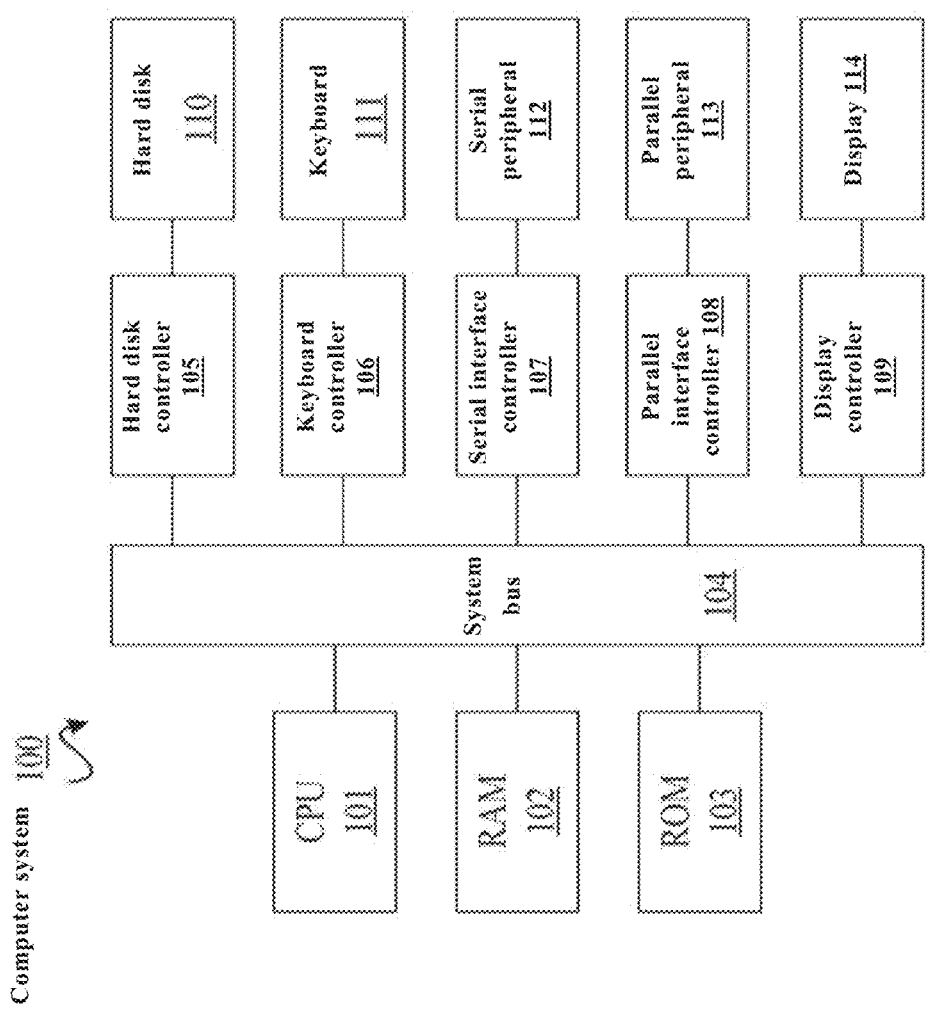
FIG. 1 shows a block diagram of an exemplary computer system 100 which is applicable to implement the embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 2 shows a flowchart of a method of processing a visible coding sequence of the present invention. The visible coding sequence comprises a plurality of time-continuous frames including multiple data frames and at least one synchronized frame. The visible coding may be at least one of: one-dimensional code, two-dimensional code, other visible coding. The two-dimensional code may comprise at least one of: white-black two-dimensional code, color two-dimensional code. The data frame is used for carrying the information to be transmitted. The synchronized frame is used for the synchronization of visible coding sequences on the playing side and capturing side.

The method of processing a visible coding sequence shown in FIG. 2A comprises the following steps. At step 201, at least synchronized frame contained in the visible coding sequence is detected. At step 203, a sampling rate and a beginning time of sampling are calculated according to the at least one synchronized frame. At step 205, the visible coding sequence is captured according to the sampling rate and the beginning time of sampling.

At step 201, at least synchronized frame contained in the visible coding sequence is detected, wherein the detection can be performed through sampling the visible coding sequence intensively. In the intensive sampling, a predetermined sampling rate which is high enough can be used to capture the visible coding sequence. The sampling rate high enough may ensure that every frame can be sampled twice or above. According to an embodiment of the present invention, the synchronized frame comprises at least one of: a white frame, a black frame. Due to the property to be easy to be detected, black and white frames are suitable to be used as synchronized frames. According to another embodiment of the present invention, the at least one synchronized frame comprises at least a black-to-white frames transition or a white-to-black frames transition at its boundaries, for example, a sequence of black, white, black frames, a sequence of white, black, white frames, a sequence of black, white, white, black frames, a sequence of white, black, black, white frames, etc. Taking a sequence of black, white, black frames as an example, it comprises one black-to-white frames transition and one white-to-black frames transition, allowing more accurate synchronized frame detection. Certainly, according to other embodiments of the present invention, the synchronized frame may also comprise a green frame, a red frame, a blue frame, a half black half white frame or various other kinds of frames.

At step 203, a sampling rate and a beginning time of sampling are calculated according to the at least one synchronized frame. The sampling rate depends on the length of frames, and the beginning time of sampling depends on a beginning time of a frame and a length of the frame. In an embodiment, each data frame is sampled once. If each data frame is sampled only once, a data frame can be sampled at the middle of its playing. For example, if a date frame is display for 0.1 s on the screen, it can be sampled at a timing point of 0.05 s to improve the accuracy of data sampling. In another embodiment, each data frame can be sampled multiple times for the purpose of error correction. For example, if a data frame is displayed on the screen for 0.1 s, it can be sampled at 0.03 s and 0.07 s.

According to an embodiment of the present invention, step 201 further comprises detecting a step signal for the synchronized frame according to a change in voltage of a light sensing device, and determining the synchronized frame according to the step signal. As to an image capturing device, the voltage of its light sensing device may vary with changes in color of captured images. Generally, when a black object is captured, the voltage of the light sensing device will become low, when a white object is captured, the voltage of the light sensing device will become high, and for a color between black and white, the voltage of the light sensing device will have an intermediate value. Because the voltage of a light sensing device depends on its particular circuit design, correspondence between black and white objects and voltages of the light sensing device is not unchanged. Depending on a particular circuit design, a varying trend reverse to the above example is also possible. It can be determined according to a change in the voltage of the light sensing device whether a step signal occurs for a black frame or a white frame, and thus the synchronized frame can be detected. Further, in this embodiment, step 203 further comprises calculating a sampling rate according to the length T of the synchronized frame, and calculating a beginning time of sampling according to the timing of the step signal and the length T of the synchronized frame. For example, the sampling rate may be 1/T, the beginning time of sampling may be a timing T/2 after the beginning of the data frame. Certainly, the present invention is not limited to sample the data frame at T/2, and the data frame can be sampled at T/3, T/4 and other timings. Below, steps 201 and 203 of the above embodiment will be described in more detail with FIGS. 3A-3C as an example.

Taking FIG. 3A as an example, the synchronized frame is a white frame. When a data frame in the visible coding sequence turns into a white frame, the voltage of the light sensing device changes to a high voltage value from an intermediate voltage value; when the visible coding sequence turns into a data frame from the white frame, the voltage of the light sensing device changes to an intermediate voltage value from the high voltage value. Because various light sensing devices may have different circuit designs, they may have different high voltage values, low voltage values and intermediate voltage values. Therefore, the voltage change of the light sensing device described in FIG. 3A is merely illustrative. Further, because the voltage is an analog signal, in practical measurement, the voltage of the light sensing device varies gradually. There are two step signals in FIG. 3A, a step signal 11 and a step signal 12 respectively. The synchronized frame can be determined through detecting step signals of the synchronization signal. After determining that the synchronized frame contains a frame, the length T of the synchronized frame can be calculated, and then a sampling rate 1/T is calculated. Assuming the timing of the step signal 11 as the timing of the step signal, the beginning time of sampling may be the timing of the step signal 11+1.5T. Assuming the timing of the step signal 12 as the timing of the step signal, the beginning time of sampling may be the timing of the step signal 12+0.5T. Those skilled in the art may understand that the beginning time of sampling may be at least one of: the timing of the step signal 11+1.5T+N×T, the timing of the step signal 12+0.5T+N×T, wherein N is a natural number. That is to say, the sampling can start at the N+1th data frame after the synchronized frame.

Figure 3B:
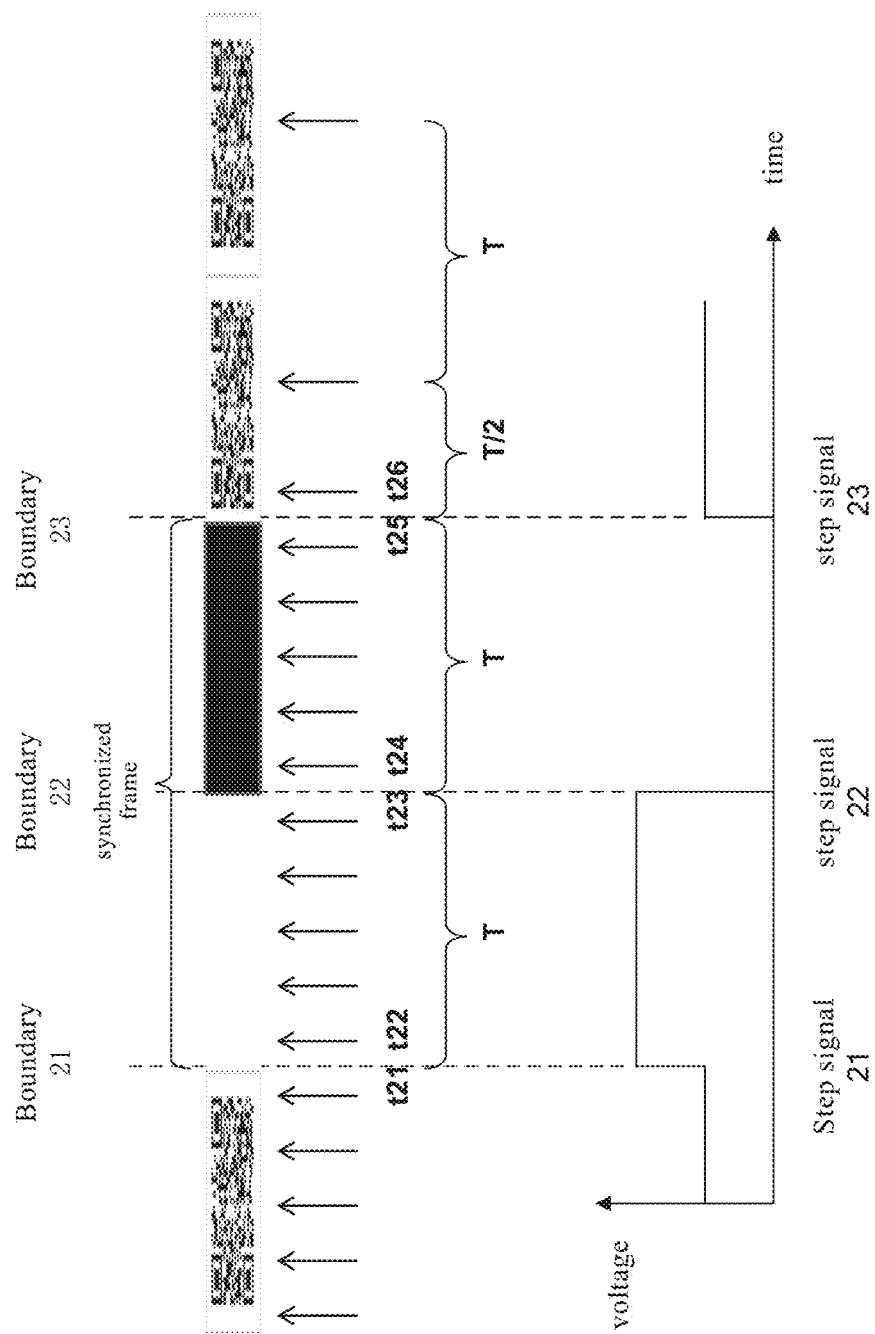
FIG. 3B shows a schematic diagram of synchronized frames according to another embodiment of the present invention.

Taking FIG. 3B as an example, the synchronized frame includes a white frame and a black frame. When a data frame in the visible coding sequence turns into a white frame, the voltage of the light sensing device changes to a high voltage from an intermediate voltage value; when the white frame in the visible coding sequence turns into a black frame, the voltage of the light sensing device changes to a low voltage value from the high voltage value; when the black frame in the visible coding sequence turns into a data frame, the voltage of the light sensing device changes to an intermediate voltage value from the low voltage value. There are three step signals in FIG. 3B, i.e., a step signal 21, a step signal 22, and a step signal 23. The inventors of the present invention further recognized that it is easier to detect the step signal 22 than the step signals 21 and 23, because the step 22 has a more significant transition therein (its voltage is changed from a high voltage to a low voltage) and thus unsusceptible to false detection. That is to say, the synchronized frame can be detected more accurately from a white-to-black frames transition and a black-to-white frames transition. In other words, a white-to-black frames transition and a black-to-white frames transition are more liable to cause a significant variation in the voltage of the light sensing device, so that false detection resulted from smaller voltage variation magnitudes due to outside environmental affects can be further reduced. After determining that the synchronized frame contains two frames, the length 2T of the synchronized frame can be calculated, and then a sampling rate 1/T is calculated. Assuming the timing of the step signal 21 as the timing of the step signal, the beginning time of sampling may be the timing of the step signal 21+2.5T. Assuming the timing of the step signal 22 as the timing of the step signal, the beginning time of sampling may be the timing of the step signal 22+1.5T. Assuming the timing of the step signal 23 as the timing of the step signal, the beginning time of sampling may be the timing of the step signal 23+0.5T. Similarly, the sampling can start at the N+1th data frame after the synchronized frame, wherein the N is a natural number.

Figure 3C:
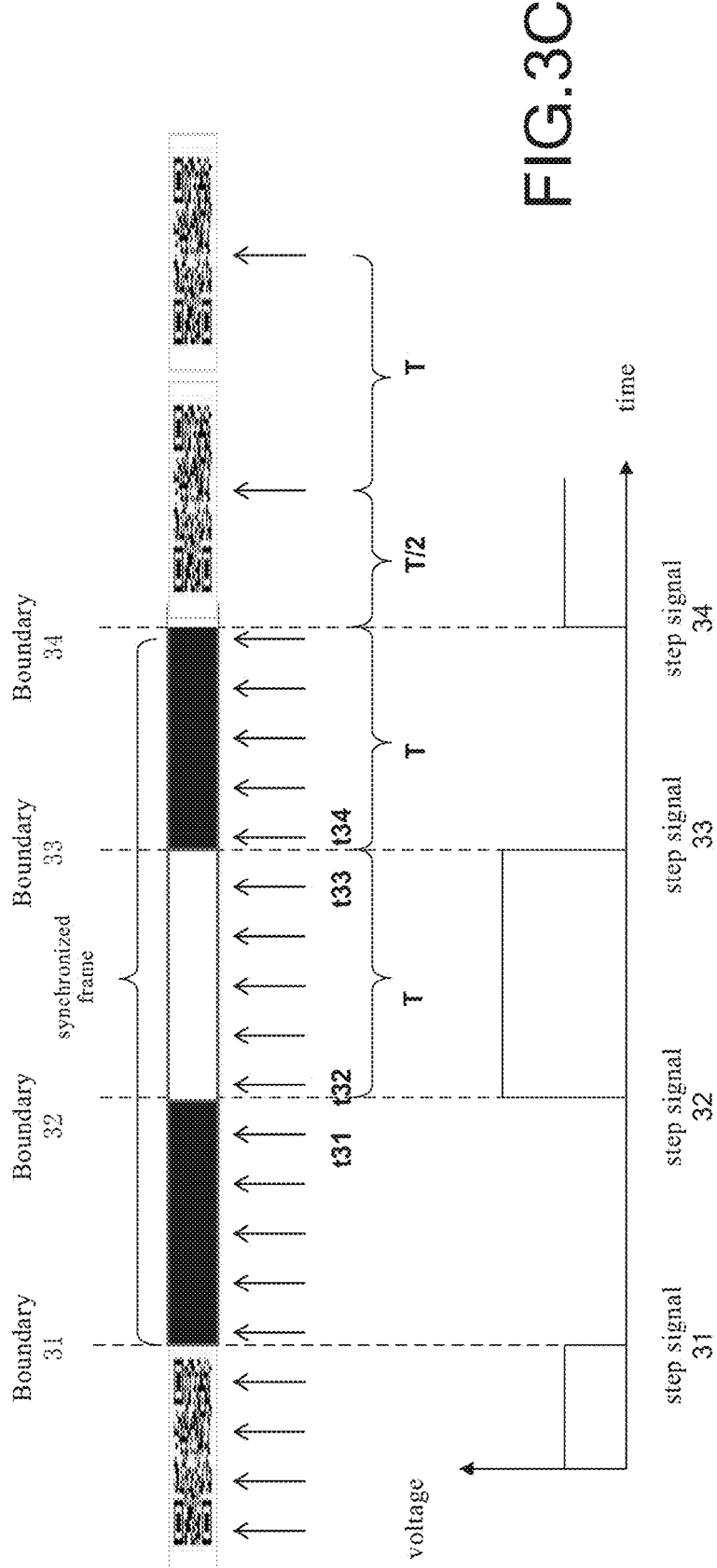
FIG. 3C shows a schematic diagram of synchronized frames according to still another embodiment of the present invention.

Taking FIG. 3C as an example, the synchronized frame is a sequence of a black frame, a white frame, and a black frame. There are four step signals in FIG. 3C, i.e., a step signal 31, a step signal 32, a step signal 33, and a step signal 34, respectively. Wherein, the step signals 32 and 33 have more observable changes in voltage than the step signals 31 and 34. The synchronized frame can be detected more accurately using the step signals 32 and 33. After determining that the synchronized frame contains three frames, the length 3T of the synchronized frame can be calculated, and then a sampling rate 1/T is calculated. Assuming the timing of the step signal 31 as the timing of the step signal, the beginning time of sampling may be the timing of the step signal 31+3.5T. Similarly, the timing of the step signal may be the timing of the step signal 32, 33 or 34. Also, the sampling can start at the N+1th data frame after the synchronized frame, wherein the N is a natural number.

According to another embodiment of the present invention, detecting the at least one synchronized frame contained in the visible coding sequence at step 201 further comprises: detecting changes in brightness of the visible coding sequence through image processing techniques DSP, and then detecting the synchronized frame from the changes in brightness. Because image processing techniques belong to the prior art, how to detect black and white frames using image processing techniques will not be described herein. In this embodiment, calculating the sampling rate and the beginning time of sampling according to the synchronized frame at step 203 further comprises: calculating the sampling rate according to the length of the synchronized frame, and calculating the beginning time of sampling according to the boundary timing of the synchronized frame and the length of the synchronized frame. For example, if the length of the synchronized frame is T, the sampling rate may be 1/T. The boundary timing of the synchronized frame may be one of: the beginning time of the synchronized frame, the ending time of the synchronized frame. If the synchronized frame comprises multiple frames, the boundary timing of the synchronized frames may further comprise the beginning time or ending time of at least one frame of the synchronized frames. Below, the embodiment will be described in more detail with FIGS. 3A-3C as examples.

In FIG. 3A, it can be detected by using an image processing technique that the synchronized frame is a white frame. Then the sampling rate 1/T is calculated according to the length T of the synchronized frame. The beginning time of sampling is at least one of: the timing of the boundary 11+1.5T, the timing of the boundary 12+0.5T, the timing of the boundary 11+1.5T+N×T, the timing of the boundary 12+0.5T+N×T, wherein N is a natural number.

In FIG. 3B, it can be detected by using an image processing technique that the synchronized frame is a white frame and a black frame. Then the sampling rate 1/T is calculated according to the length 2T of the synchronized frame. The beginning time of sampling is at least one of: timing of the boundary 21+2.5T, the timing of the boundary 22+1.5T, the timing of the boundary 23+0.5T. Also the sampling can start at the N+1th data frame after the synchronized frame, wherein N is a natural number.

In FIG. 3C, it can be detected by using an image processing technique that the synchronized frame is a sequence of a black frame, a white frame, and a black frame. Then the sampling rate 1/T is calculated according to the length 3T of the synchronized frame. The beginning time of sampling is at least one of: the timing of the boundary 31+3.5T, the timing of the boundary 32+2.5T, the timing of the boundary 33+1.5T, the timing of the boundary 34+0.5T. Also, the sampling can start at the N+1th data frame after the synchronized frame, wherein N is a natural number.

Returning to FIG. 2A, the visible coding sequence is captured according to the sampling rate and the beginning time of sampling at step 205. According to an embodiment, the capturing comprises at least one of: photographing, video recording, scanning. Photographing can be completed using a camera or a handhold mobile terminal having a camera function. Video recording can be completed using a video recorder or a handhold mobile terminal having a video recording function. The scanning can be completed using a device having a scanning function (for example, an IR scanner).

With the method of processing a visible coding sequence of the present invention, frame playing rate during the playing of the visible coding sequence can be accurately mastered, so that information of data frames can be accurately acquired. When high intensity sampling of the visible coding sequence is performed without adopting the present invention, an extra reduplication removal process is required after sampling, i.e., the removal of data frames that are sampled redundantly, power and processing resources may be unnecessarily wasted in the capturing. Therefore, the method of processing a visible coding sequence of the present invention can achieve accurate and effective data frame capturing, which may not only save costs, but also capture data frames in the visible coding sequence accurately, making it more feasible to transmit information through a visible coding sequence.

FIG. 2B shows a flowchart of a method of processing a visible coding sequence according to another embodiment of the present invention. Steps 201, 203, 205 of FIG. 2B are identical to that of FIG. 2A, which will not be repeated herein. Below, steps of FIG. 2B different to that of FIG. 2A will be emphasized in the following description.

At step 207, it is determined whether the capturing of the visible coding sequence is complete. According to an embodiment of the present invention, step 207 further comprises performing a first decoding on the data frames to acquire the length of the visible coding sequence; determining the time length of the capturing according to the length of the visible coding sequence; and determining whether the capturing of the visible coding sequence is complete according to the time length of the capturing. Data frames are in a format shown in table 1 below.

TABLE 1

Frame No.
Length of visible coding sequence
data

In table 1, the frame No. represents the serial number of a data frame in a visible coding sequence. The length of visible coding sequence represents the number of frames in the visible coding sequence. The value of the length of the visible coding sequence can be acquired through performing a first decoding on data frames. Optionally, the first decoding may comprise decoding the complete data frame to acquire the frame No., the length of visible coding sequence, and data.

Optionally, the first decoding may only decode the length of the visible coding sequence. For example, the length of the visible coding sequence can be encoded in a fixed area of a visible coding, such as the upper left corner of a two-dimensional code, so that only content in the upper left corner of the two-dimensional code need to be decoded in the first decoding, and the length of the visible coding sequence can be determined in a higher speed without the need of decoding the complete data frame. Again, the length of the visible coding sequence can be encoded according to a encoding rule A, while data is encoded according to a encoding rule B. Encoding rules A and B may have different complexities, for example, the encoding rule A is simpler, while the encoding rule B is more complex. Computing resources can be saved, because only the length of the visible coding sequence is decoded in the first decoding. Because the purpose of acquiring the length of the visible coding sequence is to determine whether the capturing of the visible coding sequence is complete, it is not necessary to decode the length of the visible coding sequence and decode data concurrently.

In an example, the length of the visible coding sequence is inserted into each data frame, such that the length of the visible coding sequence can be obtained regardless of which data frame is decoded. In another embodiment, the length of the visible coding sequence is inserted into only a part of data frames, such that the length of the visible coding sequence can be obtained only through performing the first decoding on those data frames in which the length of the visible coding sequence is inserted.

In an example, if the length of the visible coding sequence is 1000, the capturing time length may be 1000×T, wherein T is the length of a frame. In another example, if the capturing starts at the first data frame after synchronized frames, the synchronized frames at the end are deducted from a total capturing length, for example, the capturing length is 1000×T−M×T, wherein M is the number of frame in the synchronized frames.

According to an embodiment of the present invention, determining whether the capturing of the visible coding sequence is complete at step 207 further comprises: detecting flag frames in the visible coding sequence; and determining whether the capturing of the visible coding sequence is complete according to the detected flag frames.

In an example, the flag frames may comprise a beginning frame and an ending frame of the visible coding sequence. Thus, the beginning time of sampling of data frames is the beginning time of the flag frames. In another example, the flag frames may be inserted at arbitrary positions in the visible coding sequence, and the completion of the capturing can be determined when two flag frames have been detected. Also, in this example, the sampling time of data frame can start at any data frame.

In an example, the flag frames are frames having no data information carried thereon, such as one or more black frames, white frames, or frames with special patterns.

In another example, the flag frames are data frames containing specific flags, the frame structure of which is shown in table 2 below. Whether a data frame is a flag frame is determined from the special flag in the data frame. In this example, data frame decoding is required to decode at least the special flag for the determination.

TABLE 2

Frame No.
Special flag
data

According to another embodiment of the present invention, determining whether the capturing of the visible coding sequence is complete at step 207 further comprises: detecting whether there are fails in the data frames of the visible coding sequence that have been captured; re-capturing data frames having fails therein and being uncorrectable. The fails comprise failing to correctly capture data frames. Particularly, the fails comprise at least one of: capturing fails and frame missing. The capturing fails comprise situations wherein it is unable to correctly acquire the visible coding sequence due to errors in the capturing, such as obscure images captured due to hand-shaking, part or all of at least one data frame omitted from being captured due to a movement of the capturing side, part or all of at least one data frame omitted from being captured due to obstructions of other objects and insufficient light. The visible coding sequence usually has some error correcting capability. Taking two-dimensional code as an example, the error correcting capability is realized through partial information duplication occurrences. For example, a line in a two-dimensional code may have some information representing character information at other positions in addition to information of that line, so that information missing due to stains on the other lines can be corrected. However, data correction is impossible if a two-dimensional code has errors exceeding a threshold, and data frames need to be captured again. If the visible coding sequence is played in a looped manner, data frames can be recaptured in a next loop. This embodiment may ensure the timely re-capturing of the failed data frames, and thus guaranteed data integrality of the captured visible coding sequence.

Frame missing comprises omission of at least one data frame during the capturing, for example, accumulated errors may arise in calculation of the sampling rate and beginning time of sampling with the proceeding of the capturing, causing one or more data frames omitted from being captured. Whether there are missing frames in the visible coding sequence can be determined according to the Frame No. in table 1 or table 2 foregoing. Because missing frames are uncorrectable, this embodiment may recapture those missing frames to ensure data integrality of the captured visible coding sequence.

At step 209 of FIG. 2B, a notification is sent in response to the completion of the capturing of the visible coding sequence. Sending the notification can be realized through at least one of: notifying capturing completion through a light signal (such as a signal lamp), notifying capturing completion through an audio signal (such as a special music tone), notifying capturing completion through an image signal (such as displaying a specific image on the display screen of a camera device), notifying capturing completion through a text signal (such as, displaying special text on the display screen of a camera device), automatic finish of the capturing.

Steps 207 and 209 can realize the automatic notification to a photographer of when the capturing is complete, so that the photographer may be aware of capturing progress, and does not need to monitor the capturing in person.

According to another embodiment of the present invention, in the case of lacking steps 207 and 209, the photographer has to monitor the completion of the capturing on his own. For example, if the visible coding sequence is played in a looped manner, the photographer can monitor on his own whether the visible coding sequence has been captured completed according to a special indication. Again, if the visible coding sequence is not played in a looped manner, in response to one or multiple rounds of playing upon pressing a play button by the photographer, the photographer can determine capturing completion according to whether the playing has finished.

Optionally, a second decoding can be performed on the visible coding sequence at step 211 to restore original data in data frames of the visible coding sequence. The second decoding may be the same as or different to the first decoding described above. In an embodiment, if data frames contain frame serial numbers (shown in table 1 and table 2 foregoing), sequential order of various data frames can be determined according to the frame serial numbers in the second decoding. In another embodiment, if there are not frame serial numbers contained in the data frames, every data frame from a beginning frame to an ending frame of the visible coding sequence can be sequentially captured based on the beginning frame and the ending frame of the visible coding sequence in order for the second decoding.

Optionally, white balance can be adjusted for the captured visible coding sequence according to RGB values (three primary colors) of the synchronized frame at step 213. Further, adjusting white balance comprises adjusting exposure amount and shutter speed used in capturing. Many current camera devices allow photographers to adjust white balance before capturing, such as selecting a night mode, a sunny mode, or a cloudy mode, etc. Therefore, white balance can be adjusted for the captured visible coding sequence by using white balance adjustment functions of existing camera devices to reflect actual colors that are captured, and avoid subsequent decoding errors due to color shift. For instance, in an ideal condition, the black color has RGB values of (0, 0, 0), and the white color has RGB values of (255, 255, 255). If the color shift exists, for example, RGB values of the white color captured may change to (255, 255, 240), in order to compensate RGB values of the white color, RGB values of captured data frames can be compensated according to the RGB values (255, 255, 240) of a white frame in the captured synchronized frames, to restore RGB values of the white color captured to its original values (255, 255, 255). RGB values captured can be corrected and compensated through adjusting shutter speed and exposure amount. Certainly, RGB values can be corrected and compensated also when there are green, red, blue, or half black half white frames contained in the synchronized frames. This embodiment may bring about remarkable effects if data frames are represented as color two-dimensional codes, because color two-dimensional codes may cause severer color shift. Thus, performing white balance adjustment on the visible coding sequence using the synchronized frames is particularly useful to prevent color aberrations due to color shift, and thus avoid subsequent decoding errors.

According to the embodiment shown in FIG. 2B, step 213 is performed before capturing data frames, because performing white balance adjustment before capturing is of more help to prevent errors due to color shift. According to another embodiment of the present invention, step 213 can be performed after capturing data frames, such as after step 205 or 209. White balance can be adjusted for the visible coding sequence to a certain degree after capturing. Many existing image processing tools can provide white balance adjustment functions, which will not be described in detail herein.

Figure 4:
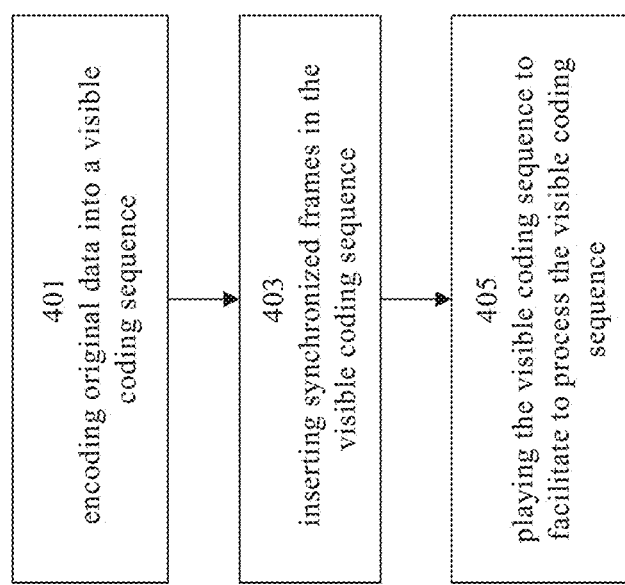
FIG. 4 shows a flowchart of playing a visible coding sequence of the present invention.

FIG. 4 shows a flowchart of a method of playing a visible coding sequence according to the present invention. At step 401, original data is encoded into a visible coding sequence, wherein the visible coding sequence comprises a plurality of time-continuous frames, including multiple data frames. Wherein, the original data may be one or more of the following items: text data, image data, audio data, video data, multimedia data, and other data that can be encoded. The present invention does not have any limits to encoding rules.

Figure 5A:
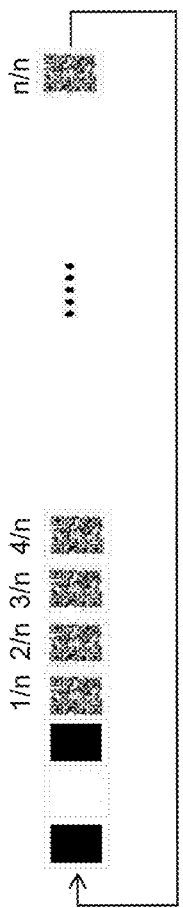
FIG. 5A shows a schematic diagram of a visible coding sequence according to an embodiment of the present invention.

At step 403, synchronized frames are inserted into the visible coding sequence. According to an embodiment of the present invention, synchronized frames can be inserted into the visible coding sequence only once (the visible coding sequence has n data frames), as shown in FIG. 5A (The exemplary synchronized frames are illustrated by a black frame, a white frame, and a black frame). Thus, a complete series of synchronized frames can be detected on the capturing side after waiting for at most n+2 frames.

Figure 5B:
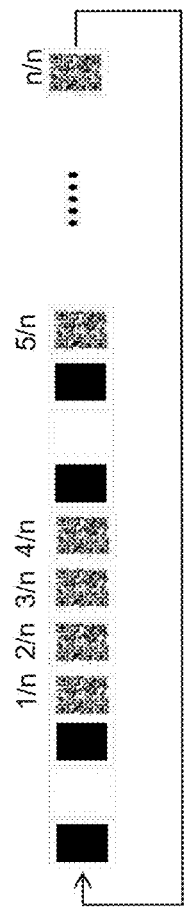
FIG. 5B shows a schematic diagram of a visible coding sequence according to another embodiment of the present invention.

According to another embodiment of the present invention, in a visible coding sequence (the visible coding sequence has n data frames), synchronized frames can be inserted multiple times (the synchronized frames that are inserted multiple times can be inserted discontinuously, for example, two times of synchronized frame insertion, one is before the first data frame, and the second is before the fifth data frame), as shown in FIG. 5B. Thus, a complete series of synchronized frames can be detected after waiting for at most n−2 frames. Multi-time synchronized frame insertion can achieve sampling rate and beginning time of sampling calibration multiple times, such as, the sampling rate and the beginning time of sampling are re-calculated every time when the synchronized frames are detected, and a remained portion of the visible coding sequence is captured according to the newly calculated sampling rate and beginning time of sampling. This embodiment is particularly useful for long visible coding sequences, because longer visible coding sequences tend to cause larger accumulated errors in their originally calculated sampling rate and beginning time of sampling. Thus, it is more desirable to insert synchronized frames in the visible coding sequence multiple times to calibrate the sampling rate and the beginning time of sampling.

Figure 5C:
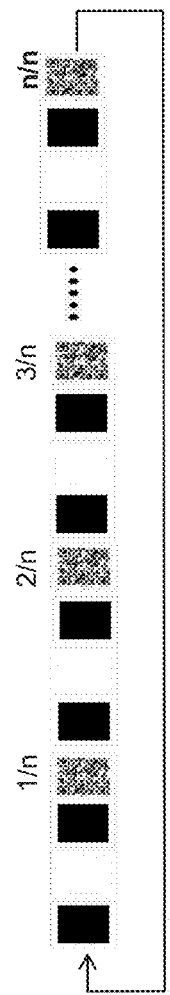
FIG. 5C shows a schematic diagram of a visible coding sequence according to still another embodiment of the present invention.

In order to further calibrate the sampling rate and the beginning time of sampling, according to another embodiment of the present invention, in a visible coding sequence, a synchronized frame can be inserted for every other data frame, as shown in FIG. 5C. Thus, the sampling rate and the beginning time of sampling can be calibrated to the most degree.

Return back to FIG. 4, the visible coding sequence is played at step 405 to facilitate to process the visible coding sequence according to the method of processing a visible coding sequence described above. According to an embodiment of the present invention, the visible coding sequence can be played in a looped manner, so that the visible coding sequence can be captured and processed on the capturing side at any time. According to another embodiment of the present invention, the visible coding sequence can be played in response to a play instruction. For example, the play instruction may be a button, which when pressed causes the play side to play the visible coding sequence. Also, the play instruction may be a scheduled play instruction for starting the play of the visible coding sequence at a predefined timing.

With the method of playing a visible coding sequence of the present invention, information can be transmitted to the receiving side in the form of continuous data frames. Since synchronized frames are inserted into the visible coding sequence, the information receiving side can accurately recognize playing rate of frames in the visible coding sequence, and acquire data frames in the visible coding sequence in a costly economic way, so that power energy and processing resources required by the information receiving side can be reduced.

A method of processing a visible coding sequence and a method of playing a visible coding sequence of the present invention have been described above, a system of processing a visible coding sequence and a system of playing a visible coding sequence under the same inventive concept will be described below with reference to FIG. 6A, FIG. 6B and FIG. 7, in which the same or corresponding details have been particularly and completely described above, and will not be repeated hereinafter.

Figure 6B:
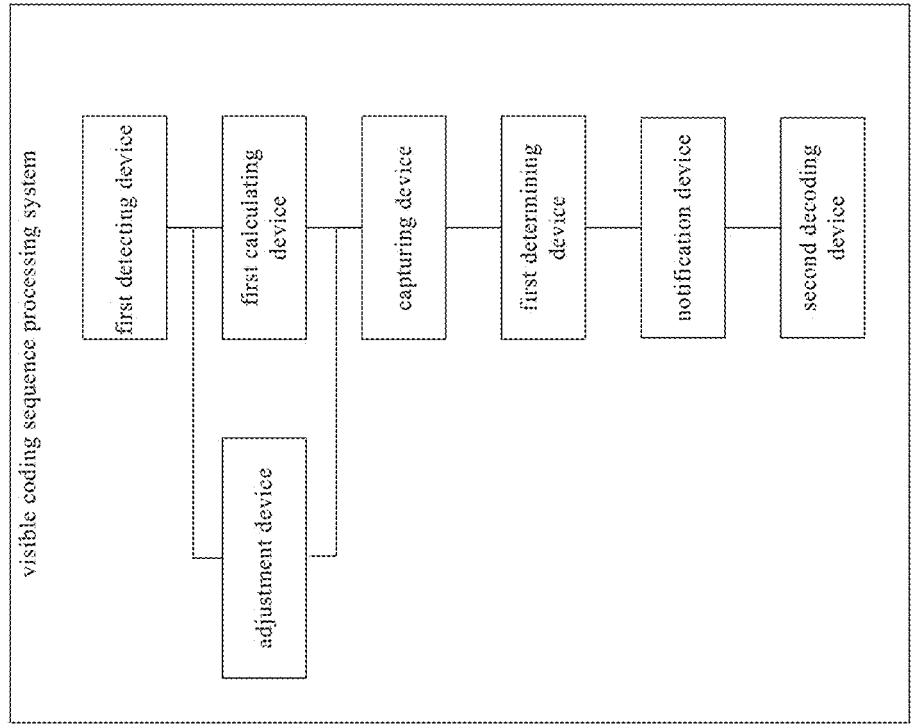
FIG. 6B shows a block diagram of a system for processing a visible coding sequence according to another embodiment of the present invention.
Figure 6A:
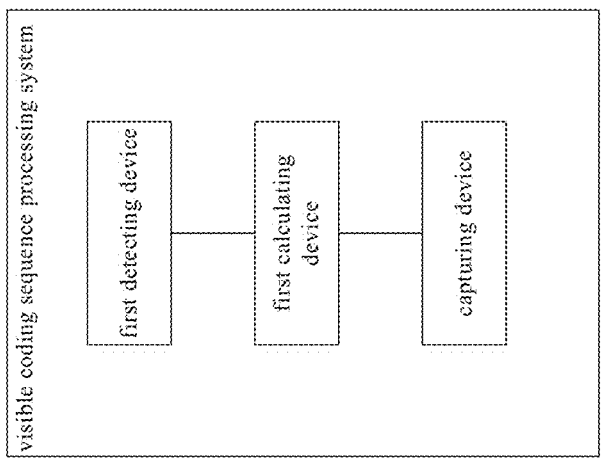
FIG. 6A shows a block diagram of a system for processing a visible coding sequence according to an embodiment of the present invention.

FIG. 6A shows a block diagram of a system of processing a visible coding sequence according to an embodiment of the present invention. Wherein, the visible coding sequence comprises a plurality of time-continuous frames, including multiple data frames and at least one synchronized frame. The system of processing a visible coding sequence comprises: a first detecting device configured to detect the at least one synchronized frame contained in the visible coding sequence; a first calculating device configured to calculate a sampling rate and a beginning time of sampling according to the at least one synchronized frame; and a capturing device configured to capture the visible coding sequence according to the sampling rate and the beginning time of sampling.

According to an embodiment of the present invention, the at least one synchronized frame comprises at least one of: a white frame, a black frame.

According to another embodiment of the present invention, the at least one synchronized frame comprises at least a black-to-white frames transition and a white-to-black frames transition.

According to an embodiment of the present invention, the first detecting device further comprises: a second detecting device configured to detect a step signal of the synchronized frame according to a voltage change of a light sensing device, and a first determining device configured to determine the synchronized frame through the step signal; and wherein the first determining device further comprises: a second calculating device configured to calculate the sampling rate according to the length of the synchronized frame, and calculate the beginning time of sampling according to the timing of the step signal and the length of the synchronized frame.

According to another embodiment of the present invention, the first detecting device further comprises: a third detecting device configured to detect a brightness change in the visible coding sequence through an image processing technique, and a second determining device configured to determine the synchronized frame through the brightness change; and wherein the first calculating device further comprises: a third calculating device configured to calculate the sampling rate according to a length of the synchronized frame, and calculate the beginning time of sampling according to the boundary timing of the synchronized frame and the length of the synchronized frame.

FIG. 6B shows a block diagram of a system of processing a visible coding sequence according to another embodiment of the present invention, in which the first detecting device, the first calculating device and the capturing device are the same as those of FIG. 6A, which will not be described repeatedly herein. Further, the system of FIG. 8B further comprises a first determining device, a notification device, a second decoding device, and an adjustment device.

According to an embodiment of the present invention, the first determining device is configured to determine whether the capturing of the visible coding sequence has been completed; and the notification device is configured to send a notification in response to completion of the capturing of the visible coding sequence.

According to an embodiment of the present invention, the first determining device further comprises: a first decoding device configured to perform a first decoding on the data frames to acquire the length of the visible coding sequence; a third determining device configured to determine a time length of the capturing according to the length of the visible coding sequence; and a second determining device configured to determine whether the capturing of the visible coding sequence has completed according to the time length of the capturing.

According to another embodiment of the present invention, the first determining device further comprises: a fourth detecting device configured to detect flag frames in the visible coding sequence; and a third determining device configured to determine whether the capturing of the visible coding sequence has completed according to the detected flag frames.

According to an embodiment of the present invention, the adjustment device is configured to adjust white balance for the captured visible coding sequence according to RGB values of the synchronized frame.

According to an embodiment of the present invention, the second decoding device is configured to perform a second decoding on the visible coding sequence to restore original data from the data frames.

Figure 7:
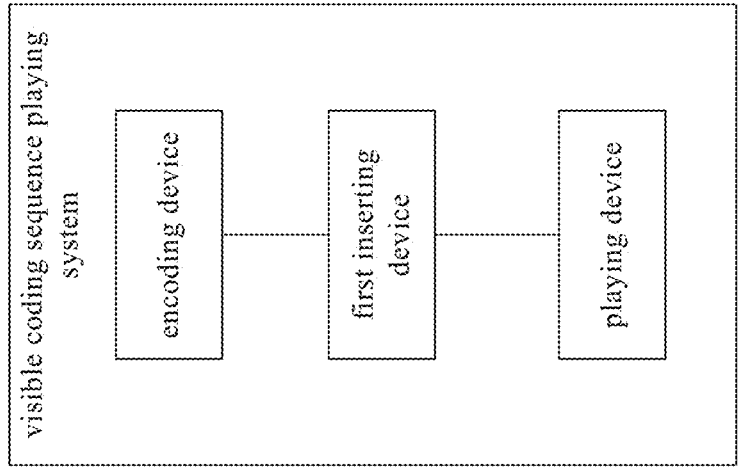
FIG. 7 shows a block diagram of a system for playing a visible coding sequence according to an embodiment of the present invention.

FIG. 7 shows a block diagram of a system of playing a visible coding sequence. The system of playing a visible coding sequence in FIG. 7 comprises: an encoding device configured to encode original data into a visible coding sequence, wherein the visible coding sequence comprises a plurality of time-continuous frames including multiple data frames; a first inserting device configured to insert synchronized frames in the visible coding sequence; and a playing device configured to play the visible coding sequence to facilitate to process the visible coding sequence according to the system of processing a visible coding sequence described above.

According to an embodiment of the present invention, the first inserting device further comprises at least one of: a second inserting device configured to insert a synchronized frame in the visible coding sequence; a third inserting device configured to insert multiple synchronized frames in the visible coding sequence; a fourth inserting device configured to insert a synchronized frame between every other data frames in the visible coding sequence.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing a visible coding sequence, comprising:
   detecting at least one synchronized frame contained in a visible coding sequence;
   calculating a sampling rate and a beginning time of sampling according to the at least one synchronized frame; and
   capturing the visible coding sequence according to the sampling rate and the beginning time of sampling,
   wherein the calculating a sampling rate and a beginning time of sampling according to the synchronized frame further comprises calculating the sampling rate according to a length of the synchronized frame, and calculating the beginning time of sampling according to the boundary timing of the synchronized frame and the length of the synchronized frame.

2. The method according to claim 1, wherein the at least one synchronized frame comprises at least one of: a white frame, a black frame.

3. The method according to claim 1, wherein the at least one synchronized frame comprises at least a black-to-white frames transition and a white-to-black frames transition at its boundaries.

4. The method according to claim 1, wherein the detecting the at least one synchronized frame contained in the visible coding sequence further comprises:
   detecting a brightness change in the visible coding sequence through an image processing technique, and
   determining the synchronized frame through the brightness change.

5. The method according to claim 1, wherein the method further comprises:
   determining whether the capturing of the visible coding sequence has been completed; and
   sending a notification in response to completion of the capturing of the visible coding sequence.

6. The method according to claim 5, wherein the determining whether the capturing of the visible coding sequence has been completed further comprises:
   performing a first decoding on the data frames to acquire the length of the visible coding sequence;
   determining a time length of the capturing according to the length of the visible coding sequence; and
   determining whether the capturing of the visible coding sequence has completed according to the time length of the capturing.

7. A system of processing a visible coding sequence, comprising:
   a detecting device configured to detect the at least one synchronized frame contained in the visible coding sequence;

a calculating device configured to calculate a sampling rate and a beginning time of sampling according to the at least one synchronized frame; and a capturing device configured to capture the visible coding sequence according to the sampling rate and the beginning time of sampling, wherein the first calculating device further comprises a calculating device configured to calculate the sampling rate according to a length of the synchronized frame, and calculate the beginning time of sampling according to the boundary timing of the synchronized frame and the length of the synchronized frame.

8. The system according to claim 7, wherein the at least one synchronized frame comprises at least one of: a white frame, a black frame.

9. The system according to claim 7, wherein the at least one synchronized frame comprises at least a black-to-white frames transition and a white-to-black frames transition at its boundaries.

10. The system according to claim 7, wherein the detecting device further comprises:

a detecting device configured to detect a brightness change in the visible coding sequence through an image processing technique, and a determining device configured to determine the synchronized frame through the brightness change.

11. The system according to claim 7, further comprising:

a determining device configured to determine whether the capturing of the visible coding sequence has been completed; and a notification device configured to send a notification in response to completion of the capturing of the visible coding sequence.

12. The system according to claim 11, wherein the determining device further comprises:

a decoding device configured to perform a first decoding on the data frames to acquire the length of the visible coding sequence;

a determining device configured to determine a time length of the capturing according to the length of the visible coding sequence; and a determining device configured to determine whether the capturing of the visible coding sequence has completed according to the time length of the capturing.

13. A computer program product stored on a computer readable storage medium, which when executed by a processor, processes a visible coding sequence, the computer program product having computer instructions to perform a method comprising:

detecting the at least one synchronized frame contained in the visible coding sequence;

calculating a sampling rate and a beginning time of sampling according to the at least one synchronized frame; and capturing the visible coding sequence according to the sampling rate and the beginning time of sampling, wherein the calculating a sampling rate and a beginning time of sampling according to the synchronized frame further comprises calculating the sampling rate according to a length of the synchronized frame, and calculating the beginning time of sampling according to the boundary timing of the synchronized frame and the length of the synchronized frame.

14. The computer program product according to claim 13, wherein the at least one synchronized frame comprises at least one of: a white frame, a black frame.

15. The computer program product according to claim 13, wherein the at least one synchronized frame comprises at least a black-to-white frames transition and a white-to-black frames transition at its boundaries.

16. The computer program product according to claim 13, wherein the detecting the at least one synchronized frame contained in the visible coding sequence further comprises:

detecting a brightness change in the visible coding sequence through an image processing technique, and determining the synchronized frame through the brightness change.

17. The computer program product according to claim 13, wherein the method further comprises:

determining whether the capturing of the visible coding sequence has been completed; and sending a notification in response to completion of the capturing of the visible coding sequence.

* * * * *